F. POMEROY.
HORSE HAY RAKE.
APPLICATION FILED AUG. 20, 1907.

915,476.

Patented Mar. 16, 1909.
3 SHEETS—SHEET 1.

Witnesses:

Inventor:
Foster Pomeroy,
By Lau Bayyu &c
Attorneys.

F. POMEROY.
HORSE HAY RAKE.
APPLICATION FILED AUG. 20, 1907.
915,476.
Patented Mar. 16, 1909.
3 SHEETS—SHEET 2.
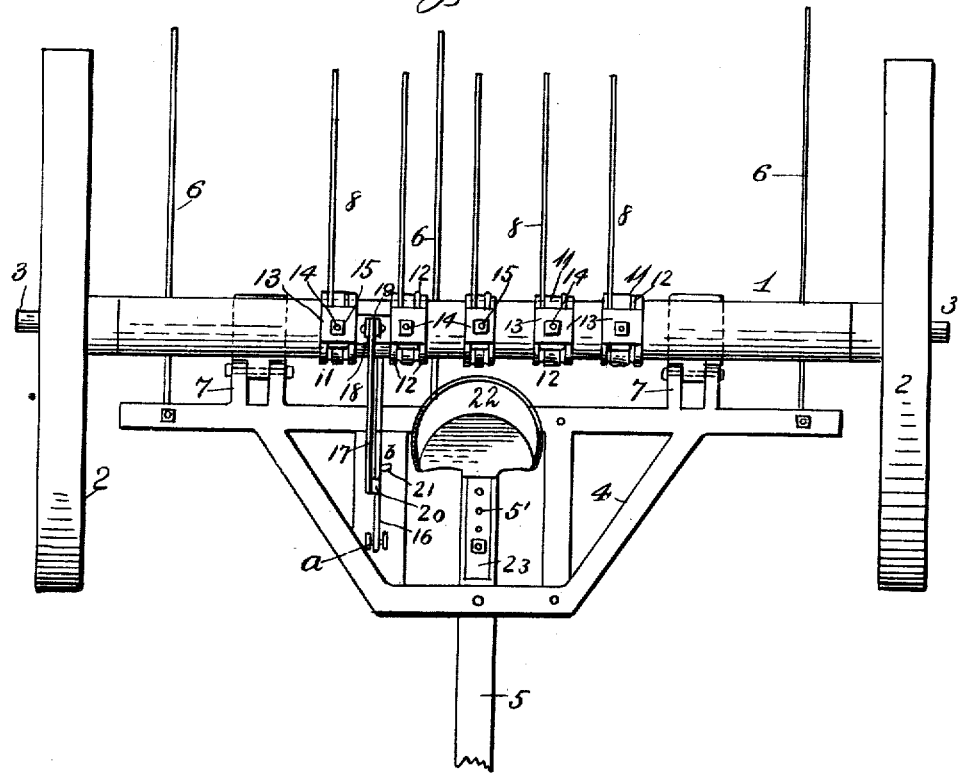
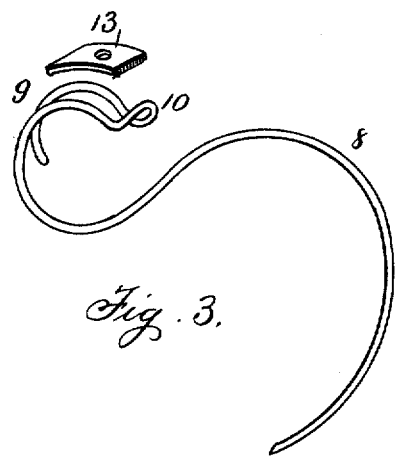
Inventor:
Foster Pomeroy,
Witnesses:
By
Attorneys

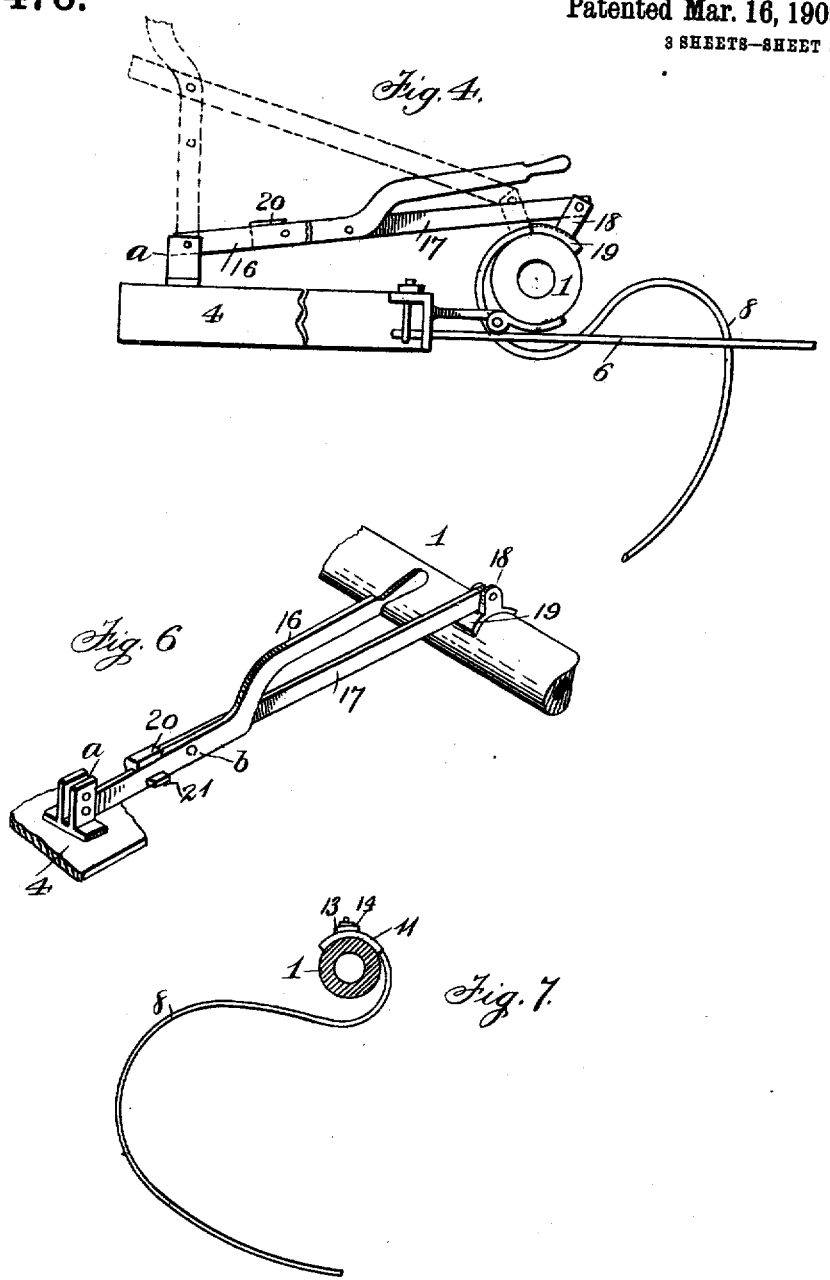

UNITED STATES PATENT OFFICE.

FOSTER POMEROY, OF LOMPOC, CALIFORNIA, ASSIGNOR OF ONE-FOURTH TO PAUL FOX AND ONE-FOURTH TO T. F. FOX, BOTH OF LOMPOC, CALIFORNIA.

HORSE HAY-RAKE.

No. 915,476.     Specification of Letters Patent.     Patented March 16, 1909.

Application filed August 20, 1907. Serial No. 389,384.

*To all whom it may concern:*

Be it known that I, FOSTER POMEROY, a citizen of the United States, residing at Lompoc, in the county of Santa Barbara and State of California, have invented certain new and useful Improvements in Horse Hay-Rakes, of which the following is a specification.

My invention relates to improvements in horse hay-rakes. Its objects are to provide for performing the raking operation in an effective manner, the hay being cleanly taken up by the teeth and allowed to climb high up within the same, increasing its carrying capacity, while providing for readily dumping the contents of the rake as well as holding it to its work; also to carry out these ends in a simple, economic and effective manner.

Said invention consists of certain features or instrumentalities substantially as hereinafter fully disclosed and pointed out by the claims.

Figure 1:
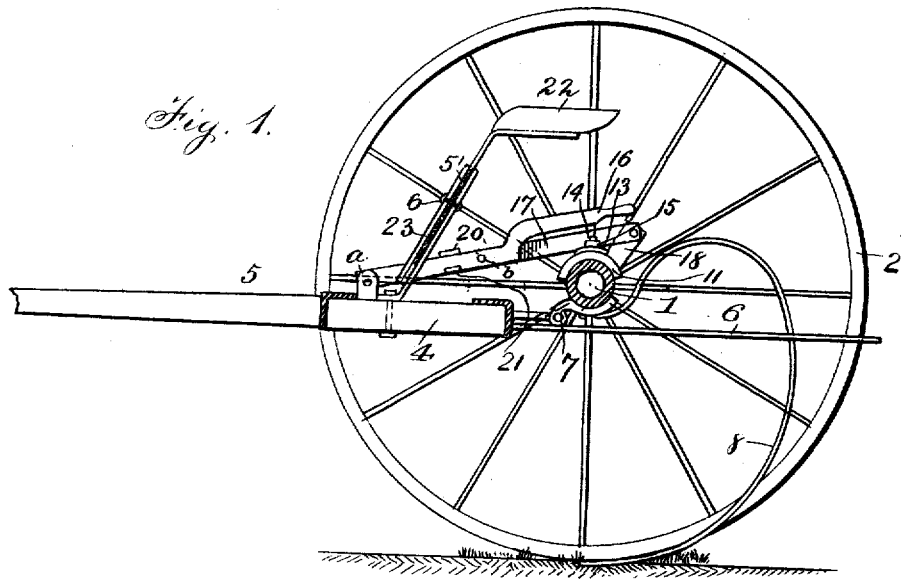
Figure 5:
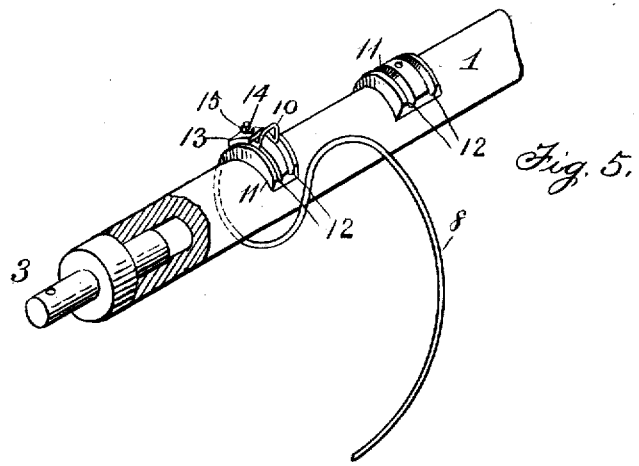

In the accompanying drawing illustrating the preferred embodiment of my invention— Figure 1 is a transverse vertical section thereof. Fig. 2 is a plan view of the same. Fig. 3 is a view showing a rake tooth and clamping plate in their relative positions although separated from each other, with the rake head omitted. Fig. 4 is an enlarged detailed side view showing more especially the rake operating lever and adjunctive parts including the rake-head or axle. Fig. 5 is a broken enlarged detailed perspective view more particularly of the rake-head or axle. Fig. 6 is a like view more especially of the projection or stud of the connecting rod between the rake-head and its operating lever for limiting or restricting the movement of said lever and connecting rod. Fig. 7 is an enlarged detailed side elevation exemplifying more particularly the outline or contour of a rake tooth.

In the disclosure of my invention, I suitably provide a preferably cylindrical hollow axle 1 equipped with transporting or carrying wheels 2 carried preferably by short journals 3 removably applied to said axle and suitably retained therein.

A suitable supporting frame or platform 4, to which is connected the tongue or draft-bar 5 and which is equipped with straight horizontal fingers 6 as commonly employed in this class of rakes, has suitable hinge-connection as at 7 with the axle 1 to allow of independent movement of said axle as is also usual in this class of rakes.

The rake comprises a number of teeth 8, preferably of spring-steel, having upper recurved portions 9, also having returned lateral terminals constituting loops 10 with their forming limbs arranged laterally of each other in a plane parallel to lines passing horizontally through the axle 1 in contradistinction to their otherwise standing one above the other, as will be readily appreciated. This doubling or returning of the forming limbs of said looped terminals of said teeth provides a relatively broad or laterally extended bearing surface with the carrying axle for effectively guarding against lateral or skewing movement thereof as would otherwise likely arise when the rake is in action. Said axle has formed or cast therewith grooved upraised portions or elevations 11, each of said elevations or upraised portions being provided with duplicate or parallel grooves 12 which receive the corresponding limbs of the looped portions of the rake-teeth; and applied to and embracing these limbs and said upraised axle portions are spring-clamp plates 13 which are slightly curved for more effectively securing that purpose. Through these plates or clamps are inserted screw-bolts 14 adapted to be screwed into said axle and to said screw-bolts are applied nuts 15 for compressing said spring-clamp plates and causing them to clamp said rake-tooth looped portion firmly in place in the grooves 12 of said axle upraised portions and thus provide for effectively retaining the rake-teeth in place upon said axle. It will be noted that the rake-teeth curve or recurve out of contact with and under the axle and rearwardly therefrom, whereby a certain amount of spring-play toward the "hay" curve or load receiving portion of the teeth is obtained and whereby, when the load is unusually heavy to prevent excessive springing of the teeth at their points under the axle. Also, it will be noted that by reason of the above described means of applying or securing the rake-teeth to the axle they may be readily and effectively shifted or re-adjusted into alinement at their points whenever that may become necessary. Said rake-teeth have their remaining portions curved well upwardly and rearwardly and finally forwardly, with their lower terminals stopping about at a vertical line, which, if produced, would pass through the axle 1 to which, as above explained, are attached the upper ends of said rake-teeth, as clearly disclosed by Fig. 7. By reason of the contour or outline above ascribed to the rake-teeth, their action is rendered such when the rake is in operation that they will take the hay closely and, therefore, cleanly from the ground or surface and the hay caused to climb or ascend well up along the teeth and thus provide for being well loaded and accordingly increasing their containing or raking capacity. Also, the load or contents of the rake-teeth, rather the major portion thereof, being thus disposed well rearward from the forward ends or points of the rake-teeth, with the latter extending well forward and in nearly straight lines, as they do as shown, said contents or load will not be liable, as would otherwise be the case, to be prematurely dumped and in a straggling manner, but the entire bulk thereof be effectively delivered by its weight at the instant of performing the dumping operation.

A manually or hand actuated lever 16 for actuating the rake, has one end pivoted as at $a$ or in any other suitable way, to the forward end of the supporting frame or platform 4 at one side of the draft or tongue attachment 5 and is arranged so as to be conveniently grasped by the operator, said lever also being preferably curved or deflected forward about from its middle to take its upper end out of alinement with other parts when in locked or depressed position, as will be later appreciated. Said lever has suitably connected thereto by a pivot-bolt $b$, about at its longitudinal center $a$ connecting bar or member 17, having its extreme rear end pivotally connected preferably to an outstanding stud 18 of an arcuate casting or plate 19 suitably fixed to the axle 1. Said connecting bar or member has its forward end extending a short distance beyond its point of connection with said lever and is provided at said end with a lateral stud or projection 20 effective for engagement with said connecting bar or member 17, parallel with which is arranged said lever as seen particularly in Fig. 4, whereby is limited the depressing or downward movement of said lever, or rather said movement is prescribed, for allowing the pivotal point of connection between said lever and connecting bar member to assume a position just a fraction below a line passing through the fulcrum of said lever and the point of connection between said connecting bar-member and the stud 18 whose carrying base-plate 19 has fixed relation with the axle 1. This arrangement provides for effecting an interlocking action between the enumerated parts and consequently the automatic retention of the rake-actuating lever in locked position or when depressed for holding the rake in effective position as during the raking operation. A lateral stout projection or stud 21, serving as a foot-rest, is also suitably fixed to the lever 16 at a point convenient for the application of the foot thereto to aid the dumping action of the rake if necessary which position it assumes when said lever is moved into the dotted line position, or to hold the rake in dumping position as in passing from one field to another when, of course, it is not desired to have the rake in operation.

A suitably provided seat 22 for the operator is mounted upon a sectional standard or support 23 suitably secured upon the rear-end portion of the draft bar or tongue 5, said seat standard or support having its sections readily adjustable by means of registering series of perforations 5' in said sections and an adjusting nut-equipped bolt or pin 6 engaging coinciding perforations of said perforation series, for providing for readily adjusting the height of said seat to suit the convenience of the operator, as will be appreciated.

It will be understood that by simply depressing the rake actuating lever 16 into the indicated full-line position the rake will be held in effective or raking position by reason of the interlocking action between the involved parts, and that by moving said lever into the dotted line position the rake is disposed so as to effect the dumping of its contained hay, after which said lever is, of course, returned to its depressed locked position again bringing the rake into effective raking action.

The rake thus constructed, it will be noted, is exceedingly simple, readily manipulated and effective in action.

I claim—

1. The combination with a suitable support having transverse approximately parallel grooves thereon, of a rake tooth bent at one end to form two curved approximately parallel members adapted to enter said grooves, an upstanding loop formed at the bend, a spring clamp plate adapted to be secured over the approximately parallel members in proximity to the loop and in position to bear against the loop to resist the tendency of the lower end of the rake tooth to turn backwardly in the operation of raking.

2. A rake tooth composed of a single piece of spring metal bent at its upper end to embrace the axle or support to which it is adapted to be secured, the terminal of this upper end bent backwardly approximately parallel with the main portion whereby two members are formed and an upstanding loop formed at the bend.

3. A horse hay-rake, comprising a rake-head axle and a tooth having an upper recurved end portion secured to the upper side of said head and curved under, and removed from contact with said head, and curving forward of and also out of contact with that side of said head, thence curved upwardly and rearwardly therefrom and downwardly and finally carried forward in substantially a straight line, with its point terminating at about a perpendicular line when produced passing through said rake-head, and means for securing said tooth to said head.

In testimony whereof I affix my signature, in presence of two witnesses.

FOSTER POMEROY.

Witnesses:
C. L. HUYCK,
J. E. OBOY.